Dec. 7, 1954  T. C. NOON  2,696,405
FLOW CONTROL APPARATUS
Filed Feb. 19, 1951  3 Sheets-Sheet 1
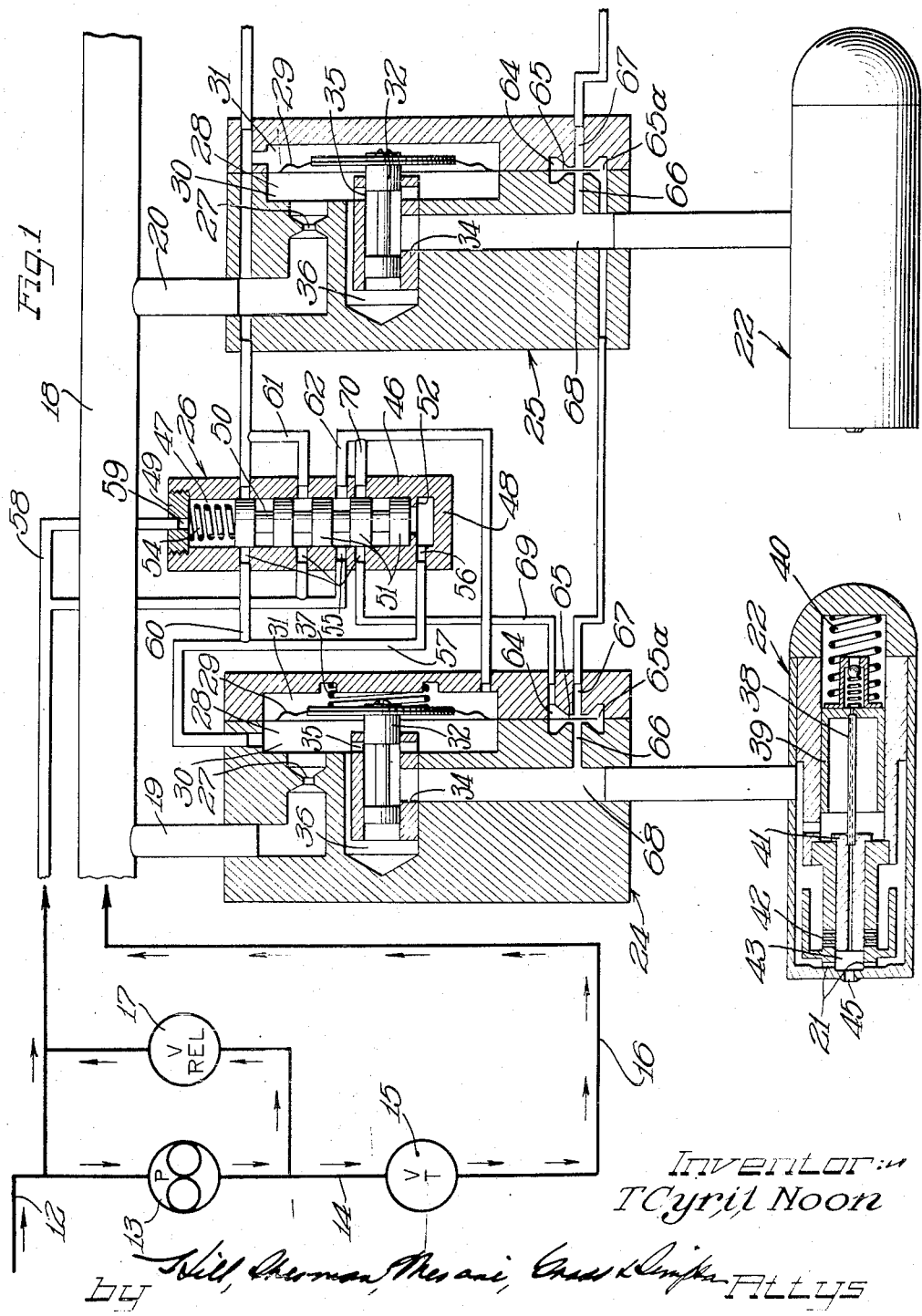
Inventor:
T Cyril Noon
by [signature] Attys

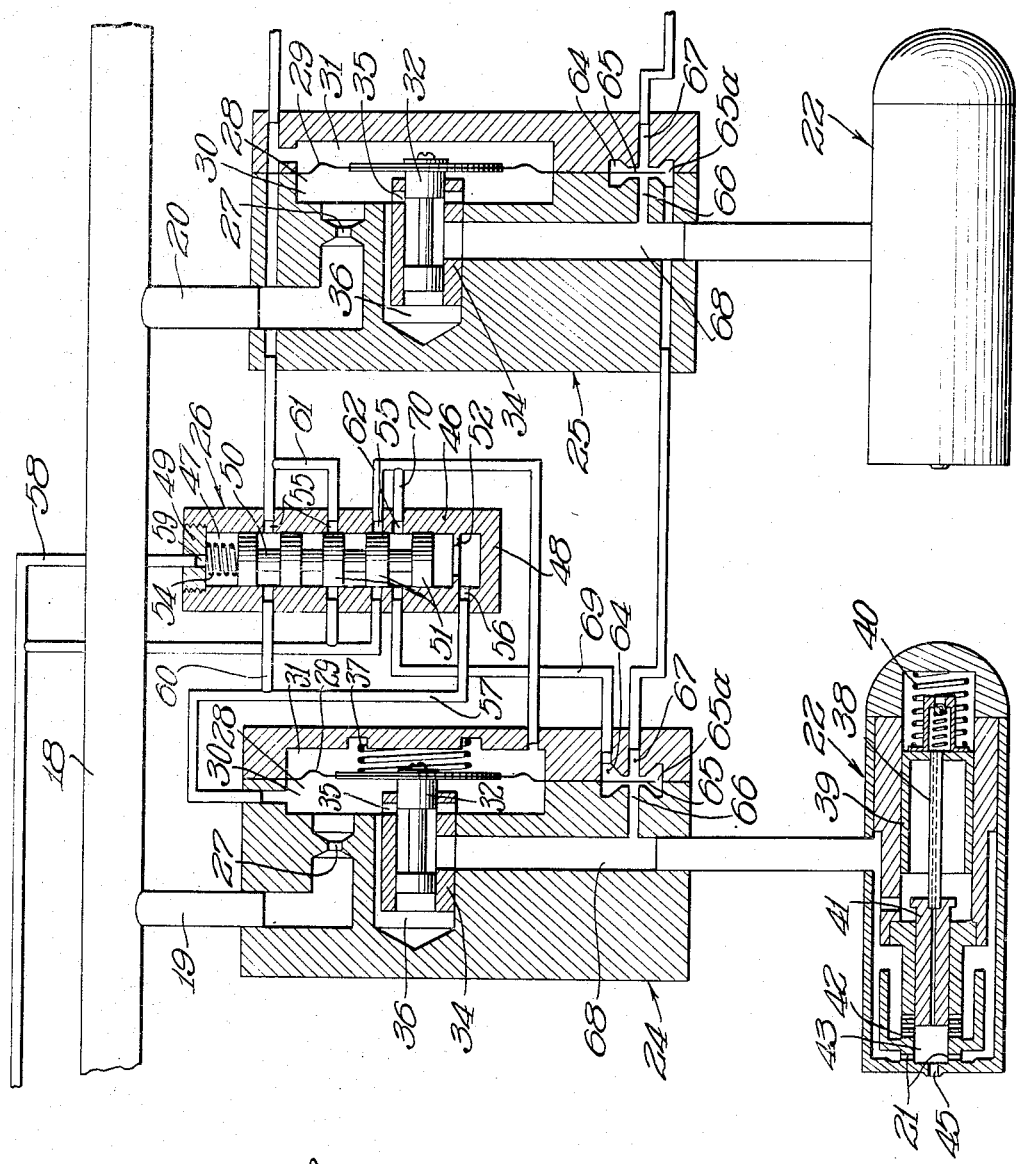

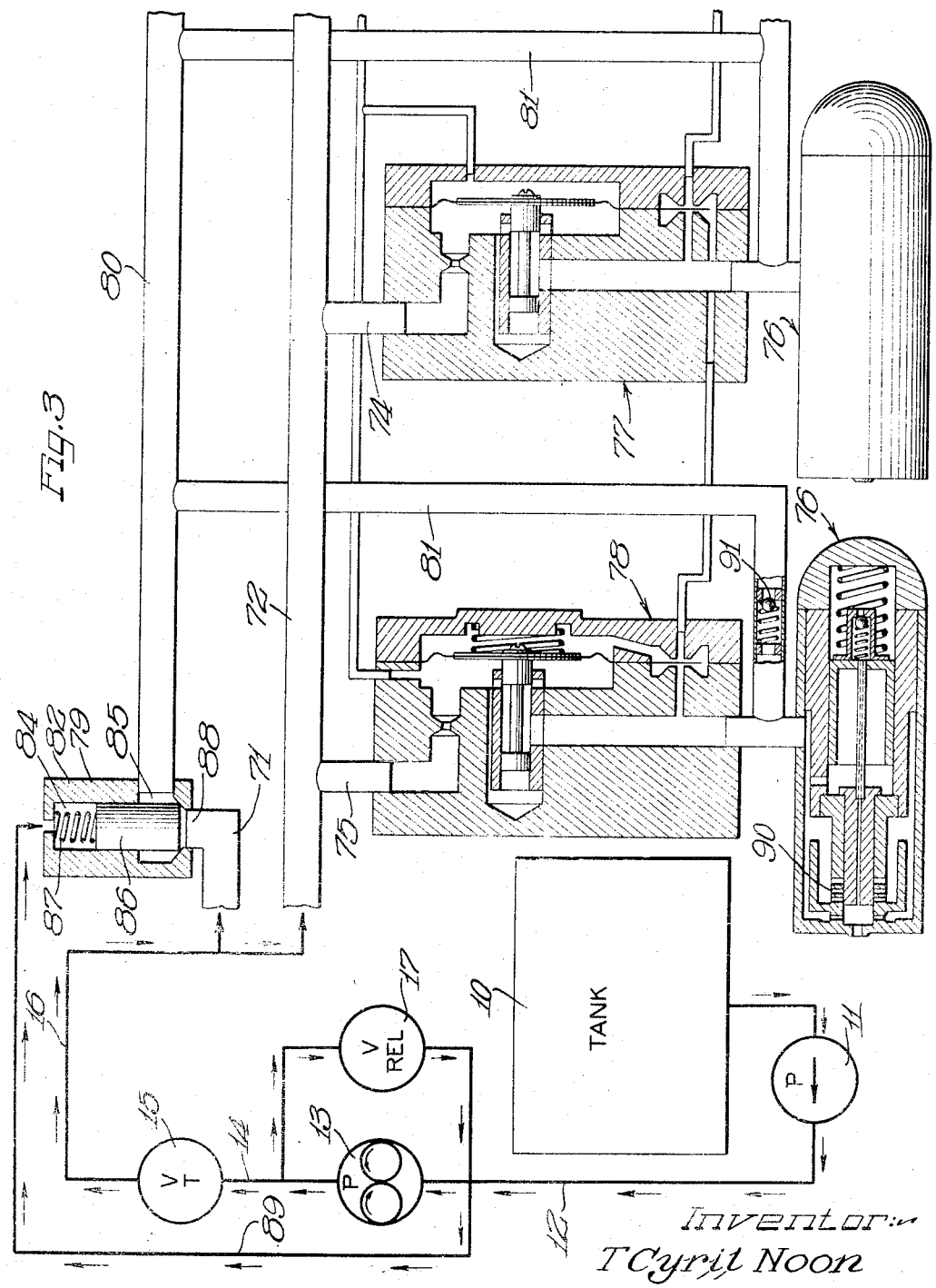

United States Patent Office 2,696,405
Patented Dec. 7, 1954

2,696,405

FLOW CONTROL APPARATUS

T Cyril Noon, Bainbridge, Ohio, assignor to Thompson Products, Inc., Cleveland, Ohio, a corporation of Ohio Application February 19, 1951, Serial No. 211,693

19 Claims. (Cl. 299—58)

This invention relates to improvements in a wide range flow distributing system and more particularly to a flow system for accurately proportioning the flows in a plurality of passages leading from a common source in which the flow proportioning is accomplished over one phase of the range by proportionally matched apertures in the respective passages and through a second phase of the range by a pressure-actuated variable orifice in series with a fixed orifice in each of the passages.

In many types of flow control system it is desirable to accurately proportion the flows through a plurality of passages from a common source over a wide range of fluid flow. For instance, in the fuel system of a gas turbine engine it is highly desirable to accurately maintain equal fluid fuel flows to each of the engine combustion chambers or cans, and because of the wide range of engine power required a consequent wide range of fluid fuel flow is necessary. An expeditious manner of accurately equalizing the fluid fuel flow to the respective combustion cans is to accurately equalize the pressure drops across matched orifices in each of the respective supply passages. However, the fluid flow range in such a system is unduly limited by the size of the matched orifices which must be small enough to properly meter the lowest flow to be utilized by the engine. This limiting of the fluid flow range can be avoided by utilizing certain means for metering the fluid flow over part of the flow range and employing additional second means for metering of the fluid flow over the rest of the range.

It is, therefore, an object of the present invention to provide an improved fluid flow control system for maintaining proportional flows in a plurality of passages over a wide range of total flow.

Another object of the invention is to provide an improved flow distributing system utilizing pressure-actuated means for shifting from low flow range to high flow range.

A further object of the invention is to provide an improved multi-passage flow distributing system having means for accurately proportioning the flow through the respective passages over successive flow ranges in conjunction with a variable area fuel discharge nozzle in each of the passages.

Still another object of the present invention is to provide a fluid flow control system for accurately proportioning flow in a plurality of passages over a wide range and embodying pressure-actuated means for metering of flow through the respective passages through part of the flow range, fixed aperture means for metering of fluid flow through the passages through the rest of the flow range and improved pressure-actuated means for shifting from one portion of the range to the other.

Other objects, features and advantages of the present invention will become apparent from the following detailed description of certain preferred embodiments of the invention taken in conjunction with the accompanying drawings, in which:

Figure 1 is a fragmentary diagrammatic partially sectional view with parts in elevation of a preferred embodiment of the flow distributing system of the present invention shown in the low flow operating range;

Figure 2 is a view similar to that of Figure 1 with the system in the high flow operating range; and Figure 3 is a fragmentary diagrammatic partially sectional view of a second embodiment of the invention shown in the low flow operating condition.

The invention will be described as embodied in an aircraft gas turbine engine fuel system, but it will be readily understood that certain features of the invention are equally applicable to other types of fluid flow control systems requiring accurate proportioning of fluid flow through a plurality of passages over a wide range of total flow.

In both embodiments of the invention fluid fuel is pumped from a tank 10 by means of a booster pump 11 (Fig. 3) through a fuel supply line 12. The fuel supply line 12 is connected to the inlet side of a fuel pump such as an engine driven gear pump 13. The outlet side of the gear pump 13 delivers fuel under an increased pressure to a pressure line 14, which, in turn, delivers fuel to a control or throttle valve 15 by which the operator can manually control the volume of fuel delivered to the system through a manifold line 16. In order to protect the system against excessive pressures which may be built up by the gear pump 13 a pressure relief valve 17 is connected in parallel with the gear pump.

In the embodiment shown in Figures 1 and 2 the manifold supply line 16 delivers a fuel to a manifold 18 for supplying a pilot passage 19 and a plurality of slave passages 20. Only one of the slave passages 20 is shown but it will be readily understood that any reasonable number may be provided, limited only by the capacity of the fuel pump and connecting lines.

According to the present invention dual flow range means are provided for accurate proportioning of fluid flow through the pilot and slave passages over a wide range of total fuel flow. Herein such means comprise matched nozzle apertures or ports 21 and discharge orifices 45 provided in variable area discharge nozzles 22, one of which is provided in each of the respective passages 19 and 20, and pressure-actuated pilot and slave metering mechanisms 24 and 25, respectively, in series with and upstream of the respective nozzles 22. In this embodiment the matched ports 21 meter fluid flow through a low portion of the flow range and the metering mechanisms 24 and 25 meter fluid flow through the remainder or high portion of the flow range. The dual flow range includes a pressure-actuated range switching or pressure directing transition control valve 26 for shifting from low flow range to high flow range and vice versa at a predetermined fluid pressure.

Referring specifically to the metering mechanisms 24 and 25, means are provided for accurately metering flow through the passages 19 and 20. In the present instance such means in each of the passages comprise a fixed area metering orifice 27 upstream of a control or diaphragm chamber 28 which contains a flexible diaphragm 29 fixedly attached therein about its entire periphery and dividing the chamber 28 into an inner flow chamber 30 and an outer control chamber 31. A slide valve 32 is operatively connected to the center of the diaphragm 29, and the slide valve together with a cooperating valve sleeve 34 provides a variable area orifice 35. A compensating chamber 36 communicates with the inner flow chamber 30 to exert a balancing pressure at the other end of the valve 32.

In the pilot metering mechanism 24, the diaphragm 29 is biased toward the closing position of the variable orifice valve 35 by means of a compression spring 37 disposed between the closure for the outer control chamber 31 and the diaphragm.

Referring specifically to the variable area nozzles, one of which is located downstream of the metering mechanisms 24 or 25 in each of the passages 19 and 20, respectively, a reciprocable flow control member includes a hollow stem 38 secured to one end to a piston portion 39 biased in one direction by a compression spring 40 to urge a control plunger 41 returned to the other end of the stem 38 to close a plurality of supply ports 42 which communicate with a swirl chamber 43 when the plunger portion 41 is positioned rearwardly. Fluid pressure is communicated to the side of the piston 39 opposite to the biasing spring 40 in order to move the reciprocable member 38 against the bias of the spring as the fluid pressure is increased to successively open the ports 42 to increase the effective flow area of the nozzle assembly for increasing the amount of fuel being sprayed from the swirl chamber 43 out of a discharge orifice 45. Referring to Figure 1, it will be seen that the low flow ports 21 are never closed by the plunger 41 and hence always communicate with the swirl chamber 43 for introducing fluid thereinto to be discharged from the discharge orifice 45 during the low flow range.

Pressure-actuated means are provided for changing from one flow range to the other. Such means comprise the control valve 26 which includes a housing 46 having a cylindrical bore 47 therein closed at one end by an integral web 48 and at the opposite end by a threaded plug 49. A valve control plunger member or spool 50 is slidably disposed within the bore 47 and has a plurality of spaced annular ribs or disks 51 in peripherally conforming contact with the defining surface of the bore 47. For providing a positive stop shoulder for arresting movement of the spool 50 short of the web 48 an integral annular rib or stop ring 52 is provided about the surface of the bore 47 in adjacent spaced relation to the web 48. In order to bias the spool 50 toward the stop shoulder a compression spring 54 is disposed between the plug 49 and the upper end of the spool.

In order to provide means for controlled communication between the valve 26 and the other positions of the flow control system a plurality of opposed pairs of control ports 55 are provided through the wall of the casing 46 and communicate with the bore 47.

For providing pressure biasing for controlling the position of the spool a pressure supply port 56 communicates with the bore 47 through the casing 46 below the stop 52. A duct 57 communicates between the pilot flow chamber 30 and the port 56 to bias the valve spool in opposition to the spring 54 in accordance with the fluid pressure in the flow chamber, and a duct 58 is connected to the low pressure supply line 12 and communicates with the bore 47 at the biased end of the spool 50 through a port 59 in the plug 49. Thus, it will be seen that the spool 50 will rest against the stop 52 until the pressure introduced through the port 56 is sufficient to move the spool against the bias of the spring 54 to the position shown in Figure 2.

For interconnecting the pilot inner flow chamber 30 with the slave outer control chambers 31 an interconnect passage 60 is provided which communicates therebetween through one pair of the opposed control ports 55 when the spool 50 is in the high flow position as seen in Figure 2. When the pressure on the foot end of the spool 50 is insufficient to overcome the bias of the spring 54 so that the foot end of the spool is against the stop 52, one of the disks or lands 51 closes off the opposed control ports, as seen in Figure 1, to cut off communication between the pilot flow chamber 30 and the slave control chambers 31.

When the spool 50 is in the low flow condition thus cutting off the inter-connect passage 60, a pair of alternate passages 61 and 62 interconnect the supply line 12 with the slave control chambers 31 and the pilot control chamber 31, respectively, in order to reference these chambers to the relatively low supply line pressure. When the spool 50 is in the high flow position of Figure 2, the opposed control ports of the valve 26 in the lines 61 and 62 are blocked off by adjacent disks or lands 51.

In operation of the device described thus far, fluid fuel under pressure is delivered by the gear pump 13 to the supply manifold 18 in accordance with the selected position of the throttle valve 15. If the pressure of this fluid after passing through the pilot metering orifice 27 is insufficient to overcome the bias of the control valve spring 54, then the high pressure interconnect passage 60 is cut off and the low pressure interconnect passages 61 and 62 are open to reference the control chambers 31 of the pilot and slave metering mechanisms to the relatively low pressure of the supply line 12. The flow chamber 30 of each of the metering mechanisms is referenced to the relatively high pressure of the supply manifold 18 less the pressure drop through the metering orifices 27. Hence, the flexible diaphragms 29 are biased to the right as seen in Figure 1, and the variable orifices 35 are full open so that the metering mechanisms 24 and 25 operate merely as open supply passages between the manifold 18 and the nozzles 22 during the low flow range.

Since the nozzle apertures 21 and preferably the discharge orifices 45 are matched and since the pressure drop through the system with the variable orifices 35 full open is practically negligible, the pressures upstream of the matched apertures 21 in each of the nozzles 22 are substantially equal. Since the pressures downstream of the discharge orifices 45 are relatively low and substantially equal during this low-flow operation, the pressure drops through all of the apertures 21 and the orifices 45 are substantially equal, and hence the flows therethrough are also substantially equal. During this low flow condition the pressure of the fluid introduced into each of the nozzles 22 is insufficient to move the reciprocable fluid flow control pistons 39 against the bias of the springs 40 and consequently the ports 42 remain covered.

Referring to Figure 2 showing the system of Figure 1 in the high flow condition, when the pressure bled from the pilot flow chamber 30 becomes sufficient to overcome the bias of the control valve springs 54, the spool 50 is moved from the stop 52 to the position shown in Figure 2. In this position the low pressure interconnect passages 61 and 62 are cut off and the relatively high pressure interconnect passage 60 is opened referencing the pilot flow chamber pressure to the slave control pressure chambers, and since the flow therebetween is relatively small, the pressures are all substantially equal. Since the flexible diaphragms 29 of the slave metering mechanisms 25 offer practically no resistance to movement in response to pressure differential thereacross, the pressures within the slave flow chambers 30 will also be equal to the pressure within the pilot flow chamber 30. This will be readily understood since as the pressure in any of the slave flow chambers 30 tends to increase, the effected diaphragm 29 will deflect to the right thereby increasing the area of the effected variable orifice 35 and tending to decrease the flow chamber pressure. Conversely, if the slave flow chamber pressure tends to decrease, the diaphragm 29 tends to move to the left to close the variable orifice 35 to increase the pressure. Therefore, the respective pressures upstream and downstream of the matched pilot and slave metering orifices 27 are maintained, respectively, substantially equal, and hence the flow through the pilot passage 19 and the slave passages 20 are maintained equal during the high flow range.

During operation in the high flow range it will be seen that the nozzle reciprocable flow control plungers 41 will be urged toward open position in accordance with the pressure introduced into the nozzles to successively open more of the supply ports 41 as the pressure increases and to successively close the same as the pressure decreases in order to vary the effective flow area in accordance with the nozzle pressures.

It will be seen that as long as the pressure requirement of the pilot nozzle is higher than that of any of the slave nozzles, the system will operate satisfactorily in the high flow condition as shown in Figure 2. However, if the pressure requirements of any of the slave nozzles become greater than that of the pilot nozzle, with the system as thus far described, the flow in the slave nozzle or nozzles in which the pressure requirements are greater will decrease below that of the pilot nozzle. This flow decrease occurs because the slave inner flow chamber pressure of the slave having the high nozzle pressure requirement increases above the pressure of the pilot flow chamber 30 in order to try and compensate for the increased nozzle pressure requirement. Hence, the pressure drop across the effected slave metering orifice 27 is decreased, thus decreasing the flow through this slave passage.

In order to prevent such a condition from occurring compensating pressure selector means are provided to insure that the highest nozzle pressure is communicated to the pilot control chamber 31. Herein such means comprise a portion of each of the flexible diaphragms 29 disposed in chambers 64 of substantially hour glass cross section to provide selector valves 65. Opposed passages 66 and 67 connect the central portion of the hour glass compensating chamber 64 in each of the metering mechanisms with a passage 68 extending between the valve 32 and the nozzle 22 and the compensating chamber of the next adjacent metering mechanism, respectively. An aperture 65a through each of selector valves 65 provides an interconnect between both sides of the compensating chamber 64 separated by the valve. Each of the compensating chambers in each of the metering mechanisms is thus connected in series to another compensating chamber which in turn is connected to a third and so on.

At one end of the series is the pilot compensating chamber which, in addition to being connected to an adjacent sleeve compensating chamber, is also connected by means of a passage 69 to one of the opposed ports 55 in the control valve 26, said port being open in the high flow condition and closed in the low flow. The opposite port is connected by means of a passage 70 to the pilot outer control chamber 31.

When the flow control apparatus is in the low flow condition the passages 69 and 70 are disconnected by the blocking action of the valve member 50 and the compensating pressure means are inoperative. However, when the flow control apparatus is in the high flow condition, the compensating pressure means act to select the highest nozzle pressure and transmit this pressure to the pilot control chamber 31. This is accomplished by means of the valve 65 which closes off either of the ports 66 or 67 in each of the metering mechanisms in accordance with whichever of the passages carries the lowest pressure, thereby successively comparing the nozzle pressures of adjacent metering mechanisms and transmitting the highest to the next and so on, until finally the highest slave nozzle pressure is compared with the pilot nozzle pressure. If the highest slave nozzle pressure is lower than the pilot nozzle pressure, then the pilot nozzle pressure will be transmitted to the pilot control chamber 31 and vice versa if the reverse is true. Thus, the pilot diaphragm 29 will always be biased, when in the high flow operating condition, toward closing of the pilot valve 32 by a pressure corresponding to the highest nozzle pressure in the series in addition to the bias of the spring 37. Because of the added bias of the spring the pressure in the pilot flow chamber 30 and consequently the pressure in all of the slave flow chambers 30 will always be higher than the highest nozzle pressure in the series, and consequently the flow metering mechanisms will maintain equal flow through all of the passages 19 and 20 during the high flow range.

Referring now to the embodiment shown in Figure 3, there is disclosed a wide flow range system which is a modification of the system of Figures 1 and 2. In this embodiment low flow metering is accomplished by metering mechanisms similar to those described in connection with Figures 1 and 2, and high flow metering is accomplished by matched nozzle apertures.

From the tank 10 to the supply line 16 the system is the same as that described in connection with the first embodiment. The downstream end of the supply line 16 is forked providing a high flow supply line 71 and a low flow supply manifold 72. The low flow manifold 72 is connected to a plurality of slave passages 74 and a pilot passage 75 operating in parallel and each having a nozzle 76 at their respective downstream ends. Between the nozzle 76 and the low flow manifold 72 each of the slave passages 74 is provided with a metering mechanism 77 which may be similar in construction and operation to the slave metering mechanism 25 discussed in connection with the first embodiment. The pilot passage 75 contains a pilot metering mechanism 78 similar in operation to the pilot metering mechanism 24 of Figures 1 and 2 and similar in construction except that the compensating chamber is directly connected to the pilot flow outer control chamber rather than being connected to a control valve such as the valve 26. Thus, the slave and pilot metering mechanisms 77 and 78 operate to correctly equalize the flows between the passages 74 and 75 during the low flow operation in a manner similar to that of the metering mechanisms 24 and 26 with the high flow operation of the first embodiment.

Means are provided for by-passing a large portion of the flow when a predetermined supply pressure is reached. Herein such means comprise a pressure operated by-pass valve 79 together with a by-pass supply manifold 80 and by-pass passages 81 which are respectively connected in parallel to the pilot and slave passages 75 and 74. The by-pass valve 79 comprises a casing 82 having a cylindrical bore 84 therein with an enlarged chamber 85 at one end thereof. A plunger-type valve member 86 is disposed in slidable peripheral conforming relationship within the bore 84 and is biased by means of a spring 87 toward one end of the casing 82 to close an aperture 88 to which the high flow supply line 71 is connected. A low pressure reference line 89 connects the portion of the bore 84 opposite to the enlarged chamber 85 to the line 12 which contains fluid under the relatively low booster pump pressure. The high flow supply manifold 80 is connected to the casing 82 and communicates with the enlarged chamber 85 to connect with the high flow supply line 71 through the enlarged chamber 85 when the valve member 86 is biased away from the aperture 88. Thus, it will be seen that upon the reaching of a predetermined pressure in the high flow supply line 71 the pressure against the valve member 86 at the aperture 88 will overcome the bias of the spring 87 to shift the valve member to connect the high flow of the supply line 71 with the high flow supply manifold 80.

When the by-pass valve 79 is in the open or high flow condition, fluid under pressure passes into the high flow manifold 80 and through each of the by-pass passages 81 to each of the nozzles 76. In the nozzle 76 means are provided for accurately metering the fluid flow to be discharged therefrom in order to maintain the flows from each of the nozzles 76 equal. Herein such means comprise matched supply apertures or ports 90 which are similar to the supply ports 42 of the nozzle 22 in Figures 1 and 2 except that the successive ports are matched in order to maintain equal flow therethrough in each of the nozzles 76 when the upstream pressures are the same. It will be understood that the nozzles 76 otherwise operate in the same manner as the nozzles 22 in the embodiment of Figures 1 and 2 to bias the reciprocable control member further rearwardly upon increase in the supply pressure to successively uncover more of the ports or apertures 90.

The by-pass lines 81 and the by-pass manifold 80 are large enough so that the pressure drops therethrough are negligible so that the pressure upstream of the apertures 90 in each of the nozzles 76 are equal and hence the flows therethrough are equal. Since the pilot and slave metering mechanisms 78 and 77 are largely by-passed in this high flow range because of their greater resistance to flow, only a relatively small portion of the flow will be metered through these mechanisms during the high flow range.

In order to prevent back flow into the by-pass lines 81 during the low flow condition, fluid check means are provided. In the present instance such means comprise a ball check valve 91 in each of the by-pass lines 81 to allow flow toward the nozzles 76 with relatively small pressure drops but to effectively prevent back flow into the lines 81.

From the foregoing description it will be understood that the present invention provides two embodiments of an improved wide flow range device for accurately proportioning fluid flow through a plurality of passages operating in parallel. In the first embodiment low flow proportional metering is accomplished by matched nozzle slots and high flow metering is accomplished by metering mechanisms which act to equalize the pressure drops across matched orifices. Expeditious pressure-actuated control means are provided for switching from low to high flow and vice versa. In the second embodiment the low flow metering is accomplished by metering mechanisms and the high flow metering is accomplished by matched nozzle slots in each of the nozzles. A by-pass valve is provided to open at a predetermined pressure to allow by-passing of the metering mechanisms for the high flow condition.

It will be understood that modifications and variations may be effected without departing from the scope of the novel concepts of the present invention.

I claim as my invention:

1. A flow distributing system for proportionally distributing flow to a plurality of outlets over a wide range of flow comprising fixed area metering ports having respective proportional areas for proportionally metering flow to the respective outlets over one portion of said flow range, pressure-actuated means for proportionally metering the flow to the respective outlets over a second portion of said flow range, said pressure-actuated means including fixed area orifices having respective proportional areas, a variable area orifice in series with and downstream of each of said fixed area orifices, respective diaphragms connected to said variable area orifices for controlling the same in response to respective pressures on each side of the diaphragm, fluid stream pressure acting on one side of each of said diaphragms to bias said variable area orifices toward opening position, spring means biasing one of said variable area orifices toward closing position, pressure-actuated valves referenced to the stream pressure downstream of the respective variable area orifices for actuating the valves in one direction, interconnect passages successively referencing said valves in series to the stream pressure downstream of another of said variable orifices for actuating the valves in the opposite direction, said valves acting to cut off the reference to all of said stream pressures except the highest stream pressures by successively comparing said pressures, and a passage referencing the highest of said valve stream pressures against said spring biased diaphragm to bias the connected variable orifice toward closing position.

2. In a fluid flow control system for maintaining proportional flows to a plurality of outlets over a total range of flow, a plurality of passages connected to said outlets, pressure-actuated means for proportionally metering fluid flow through said respective passages over a low portion of said flow range, a plurality of by-pass passages connected to said respective outlets and by-passing said pressure-actuated means for conducting fluid flow over a high portion of said flow range, and fixed area metering ports with respective proportional areas for proportionally metering the flow over said high portion of the flow range.

3. A fluid flow control system for maintaining proportional flows through a plurality of passages over a wide range of total flow comprising fixed aperture means for maintaining proportional flow through the respective passages over a low portion of said flow range, means for accurately metering fluid flow through the respective passages over a high portion of said flow range, said metering means including a fixed orifice in each of the flow passages and a variable area orifice downstream of each of said fixed orifices, said variable area orifices having actuating means responsive to fluid pressure for maintaining the pressure in the respective passages between the fixed and variable orifices equal.

4. In a flow distributing system for proportionally distributing flow to a plurality of outlets over a wide range of flow comprising a plurality of passages connected to said outlets, pressure-actuated means for proportionally metering fluid flow through said respective passages over a low portion of said flow range, said means including fixed area orifices having respective proportional areas and a variable area orifice in series with and downstream of each of said fixed area orifices, said variable area orifices having actuating means responsive to fluid pressure for maintaining the fluid pressure in the stream between the respective fixed and variable area orifices series equal, a plurality of by-pass passages connected to said respective outlets and by-passing said pressure-actuated means for conducting fluid flow over a high portion of said flow range, and fixed area metering ports with respective proportional areas for proportionally metering the flow over said high portion of the flow range.

5. In a fluid flow control system for maintaining proportional flows through a plurality of passages over a total range of flow, fixed area metering ports in the respective passages and having respective proportional areas for proportionally metering the flow through the respective passages over a low portion of said flow range, pressure-actuated means for proportionally metering the flow through the passages over a high portion of said flow range, said means including a fixed area orifice in each of the respective passages having respective proportional areas and a variable area orifice in series with and downstream of each of said fixed area orifices, said variable area orifices having actuating means responsive to fluid pressure for maintaining the fluid pressure in the passage between the respective fixed and variable area orifices series equal, and variable area nozzles each connected to a respective passage and having a reciprocable fluid flow control member and a plurality of fluid supply ports, said reciprocable members successively uncovering additional supply ports in response to increased fluid pressure in the nozzle.

6. In a fluid flow control system for maintaining proportional flows for discharging from a plurality of nozzles over a wide range of flow, a plurality of passages connected to the respective nozzles, pressure-actuated means for proportionally metering fluid flow through said respective passages over a low portion of said flow range, a plurality of by-pass passages connected to said respective nozzles and by-passing said pressure-actuated means for conducting fluid flow over a high portion of said flow range, fixed area metering ports with respective proportional areas for proportionally metering the flow over said high portion of the flow range, and variable area nozzles each having a reciprocable fluid flow control member and a plurality of fluid supply ports, said reciprocable members successively uncovering additional supply ports in response to increased fluid pressure in nozzles.

7. A fluid flow control system for maintaining proportional flows through a plurality of passages over a wide range of total flow comprising fixed aperture means for maintaining proportional flow through the respective passages over a low portion of said flow range, means for accurately metering fluid flow through the respective passages over a high portion of said flow range, said metering means including a fixed orifice in each of the flow passages and a variable orifice downstream of each of said fixed orifices, said variable orifices having actuating means responsive to fluid pressure for maintaining the pressures in the respective passages between the fixed and variable orifices equal during the high portion of said flow range, and a fluid pressure directing valve operatively connected to said actuating means for controlling said variable orifice, said directing valve having a reciprocable control member therein and a spring biasing said control member toward one end of the directing valve to direct fluid pressure to said actuating means to actuate said variable orifice toward full open position during said low portion of the flow range, fluid pressure biasing said control members toward the other end of said directing valve to permit said actuating means to maintain said equal pressures during said high portion of the flow range.

8. A flow distributing system for proportionally distributing flow through a plurality of passages over a wide range of flow comprising fixed area metering ports having respective proportional areas for proportionally metering flow through the respective passages over a low portion of said flow range, pressure-actuated means for proportionally metering fluid flow through the respective passages over a high portion of said flow range, said pressure-actuating means including a fixed area orifice having respective proportional areas in each passage and a variable area orifice in series with and downstream of each of said fixed area orifices, respective diaphragms connected to said variable area orifices for controlling the same in response to the respective pressures on each side of the diaphragms, fluid stream pressure acting on one side of each of said diaphragms to bias said variable area orifices toward opening position, spring means on the other side of one of said diaphragms to urge the connected variable orifice toward closing position, a fluid pressure directing valve having first ports directing relatively low fluid pressure on said other side of said spring bias diaphragm and second ports pressure connecting the other side of the other diaphragm with the same pressure biased side of said spring biased diaphragm, said pressure directing valve having a reciprocable spool therein and a spring biasing said spool toward one end of said valve to close said second ports during said low portion of the flow range, and fluid stream pressure biasing said spool toward the other end of said valve to close said first ports during said high portion of the flow range.

9. In a fluid flow control system for maintaining proportional flows to a plurality of outlets, a plurality of passages connected to said outlets, pressure-actuated means for proportionally metering fluid flow through said respective passages over a low range of fluid flow, a plurality of by-pass passages connected to said respective outlets and by-passing said pressure-actuated means for conducting fluid flow over a high flow range continuous with said low flow range, fixed area metering ports with respective proportional areas for proportionally metering the flow over said high flow range, a by-pass control valve controlling fluid flow to said by-pass passages, said by-pass valve having a reciprocable control member therein and a spring biasing said control member toward by-pass closing position, and fluid stream pressure biasing said valve toward by-pass opening position.

10. In a fluid flow control system for maintaining proportional flows to a plurality of nozzles, respective passages connected to the nozzles, pressure-actuated means for proportionally metering fluid flow through said respective passages over a low range of fluid flow, respective by-pass passages connected to said respective nozzles and by-passing said pressure-actuated means for conducting fluid flow over a high flow range continuous with said low flow range, fixed area metering ports in the nozzle with respective proportional areas for proportionally metering the flow over said high flow range, a by-pass control valve controlling fluid flow to said by-pass passages, said by-pass valve having a reciprocable control member therein and a spring biasing said control member toward by-pass closing position, fluid stream pressure biasing said valve toward by-pass opening position, and variable area nozzles each having a reciprocable fluid flow control member and a plurality of fluid supply ports, said reciprocable flow control members successively uncovering additional supply ports in response to increased fluid pressure in the nozzle.

11. In a fluid flow control system including pressure-actuated means for proportionally metering flow through a plurality of passages over a first flow range and a plurality of fixed area metering apertures with respective proportional areas for metering flow through the passages over a second flow range, a flow range control valve comprising a body portion with a cylindrical bore therein and having a first set of opposed ports controlling fluid metering in one of said flow ranges and a second set of opposed ports controlling fluid metering in the other of said flow ranges, a reciprocable spool slidably disposed in said bore and having a plurality of spaced disks in peripheral conforming contact with the wall of the bore, a spring biasing said spool toward one end of said bore to cover said first ports by said disks, and fluid pressure biasing said spool toward the other end of said bore to cover said second ports by said disks.

12. A flow distributing system for proportionally distributing flow through a plurality of outlets over a wide range of flow comprising metering ports having respective proportional areas for proportionally metering flow to the respective outlets over one portion of said flow range, pressure-actuated means for proportionally metering the flow to the respective outlets over a second portion of said flow range, said pressure-actuated means including metering orifices in said outlets having respective proportional areas, a variable area orifice means in series with and downstream of each of said metering orifices and having a variable orifice controlling one of said outlets, and an oppositely acting pressure responsive device operatively connected to each of said variable area orifice means for controlling said orifices in response to respective pressures on each side of said device, fluid stream pressure in said outlets acting on one side of each of said devices to bias said variable area orifice means toward orifice opening position, pressure actuated valves referenced, to the stream pressure downstream of the respective variable area orifices for actuating the valves in one direction, interconnected passageways successively referencing said valves in series to the stream pressure downstream of other of said variable orifices for actuating the valves in the opposite direction, said valves acting to select the highest stream pressure by successively comparing said pressures, and a passage referencing the highest of said valve stream pressures against the other end of said pressure responsive device to bias the variable orifice means toward orifice closing position.

13. A fluid flow control system for maintaining proportional flows through a plurality of passages over a wide range of total flow comprising aperture means for maintaining proportional flow through the respective passages over a low portion of said flow range, means for accurately metering fluid flow through the respective passages over a high portion of said flow range, said metering means including a metering orifice in each of the flow passages and a variable orifice means having a variable orifice downstream of each of said metering orifices, said variable orifice means having actuating means responsive to fluid pressure for maintaining the pressures in the respective passages between the metering and variable orifices equal during the high portion of said flow range, a fluid pressure directing valve operatively connected to said actuating means for controlling said variable orifices, said directing valve in one position directing fluid pressure to said actuating means to actuate said variable orifices toward full open position during said low portion of the flow range and in the other position interconnecting said actuating means to maintain said equal pressures during said high portion of the flow range, and means controlled by fluid pressure responsive to fluid pressure in said system to shift said valve from one position to the other position.

14. A flow distributing system for proportionally directing flow through a plurality of passages over a wide range of flow comprising metering ports having respective proportional areas for proportionally metering flow through the respective passages over a low portion of said flow range, pressure-actuated means for proportionally metering fluid flow through the respective passages over a high portion of said flow range, said pressure-actuating means including metering orifices having respective proportional areas in said passages and a variable area orifice means having a variable orifice in series with and downstream of each of said metering orifices, respective oppositely acting pressure balancing devices operatively connected to said variable area orifice means for controlling said variable area orifices in response to the respective pressures on each side of said devices, fluid stream pressure in said passages acting on one side of each of said devices to bias said variable area orifice means toward orifice opening position, a fluid pressure directing valve having a first port for directing relatively low fluid pressure on the other side of each of said pressure responsive devices and a second port for connecting the other side of each of said pressure responsive devices with a common relatively higher fluid pressure, said pressure directing valve in one position closing said second port during said low portion of the flow range, and in the other position closing said first port during said high portion of the flow range, and means for shifting said valve from said first position to said second position in response to fluid pressure in said system.

15. A flow distributing system for proportionally distributing flow from a fluid supply source to a plurality of outlets over a total flow range including a first flow range and a second flow range, comprising pressure-actuated means downstream of said fluid supply source for proportionaly metering the flow from said source to the respective outlets over said first flow range, said pressure actuated means including fixed area orifices having respective proportional areas and a variable area orifice in series with and downstream of each of said fixed area orifices, and means controlling said variable area orifices for maintaining the fluid pressure equal between the respective fixed and variable area orifices, variable area nozzles having inlets downstream of said pressure actuated means and providing said outlets, a plurality of passages connecting said fluid supply source with the respective inlets of said nozzles for affording substantially open flow paths with negligible pressure drop therethrough in said second flow range, and spring biased variable orifice means restricting flow in said passages in one position to prevent open flow therethrough and movable in response to pressure in said second flow range out of flow restricting position to afford open flow through said passages to said nozzles, said nozzles providing proportional metering orifices over said second flow range.

16. A flow distributing system for proportionally distributing flow from a fluid supply source to a plurality of outlets over a total flow range including a first flow range and a second flow range, comprising pressure actuated means downstream of said fluid supply source for proportionally metering the flow from said source to the respective outlets over said first flow range, variable area nozzles having inlets downstream of said pressure actuated means and providing said outlets, a plurality of passages connecting said fluid supply source with the respective inlets of said nozzles for affording substantially open flow paths with negligible pressure top therethrough in said second flow range, and variable orifice means restricting flow in said passages in one position to prevent open flow therethrough and movable in response to pressure in said second flow range out of flow restricting position to afford open flow through said passages to said nozzles, said nozzles providing proportional metering orifices over said second flow range.

17. A flow distributing system for proportional distribution flow from a fluid supply source to a plurality of outlets over a total flow range including a first flow range and a second flow range, comprising pressure actuated means downstream of said fluid supply source for proportionally metering the flow from said source to the respective outlets over said first flow range, said pressure actuated means including fixed area orifices having respective proportional areas and a variable area orifice in series with and downstream of each of said fixed area orifices, said pressure-actuated means further including valve means controlling said variable area orifices, and an oppositely acting pressure responsive device connected to each of said valve means for controlling said variable orifices in response to respective pressures on each side of said device, one side of each of said devices being referenced to fluid pressure between the respective fixed and variable area orifices and the other side of each of said devices being referenced to substantially equal pressure, said oppositely acting pressure responsive devices acting to reduce the size of said variable area orifices upon decrease in pressure between the respective fixed and variable area orifices, and acting to increase the area of said variable area orifices upon increase in pressure between the respective fixed and variable orifices, variable area nozzles having inlets downstream of said pressure actuated means and providing said outlets, a plurality of passages connecting said fluid supply source with the respective inlets of said nozzles for affording substantially open flow paths with negligible pressure drop therethrough in said second flow range, and variable orifice means restricting flow in said passages in one position to prevent open flow therethrough and movable in response to pressure in said second flow range out of flow restricting position to afford open flow through said passages to said nozzles, said nozzles providing proportional metering orifices over said second flow range.

18. In fluid flow apparatus, a plurality of separate fluid flow passages, metering means in each of said passages including a metering orifice and a valve downstream from said orifice, means actuated in response to an increasing differential in pressure between the pressure downstream from one of said metering means and the pressure at a region intermediate one of said valves and the orifice associated therewith for moving said one of said valves toward closed position, a duct communicating with said region, and means actuated in response to an increasing differential in pressure between the pressure in said duct and the pressure in a region intermediate another of said valves and the associated orifice for moving said another of said valves toward closed position.

19. In fluid flow apparatus, a plurality of separate fluid flow passages, and means for obtaining proportioned flow in said passages over a total flow range including a low flow range and a high flow range, comprising: means defining a low flow path and a high flow path communicating with each of said passages with at least a portion of said low path being in separate parallel fluid flow relation with a portion of said high flow path and with any remaining portions of said paths being co-extensive, a first set of metering means including fixed matched orifices in said portions of said low flow paths for metering and proportioning flow in said low flow range, pressure responsive valve means in said portions of said high flow paths arranged to move toward closed position with flow in said low flow range thereby to cause said first set of metering means to be effective and to move toward open position with flow in said high flow range thereby to increase flow in said high flow range without necessitating excessive pressures, and a second set of metering means including fixed matched orifices in said high flow paths arranged for metering and proportioning flow in said high flow range, at least one of said sets of said metering means further including valve means in one of the flow paths associated therewith actuated in reference to flow in another of the flow paths associated therewith to cooperate with said fixed orifice means in maintaining proportioned flow.

References Cited in the file of this patent

UNITED STATES PATENTS

| Number | Name | Date |
|---|---|---|
| 2,310,984 | Mock et al. | Feb. 16, 1943 |
| 2,361,227 | Mock | Oct. 24, 1944 |
| 2,536,440 | Greenland | Jan. 2, 1951 |

FOREIGN PATENTS

| Number | Country | Date |
|---|---|---|
| 577,132 | Great Britain | May 7, 1946 |